(No Model.)
W. WHARTON, Jr.
TRACTION ROPE RAILWAY.
No. 281,593. Patented July 17, 1883.
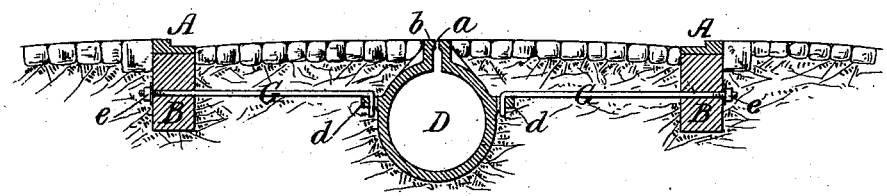
FIG. 1.
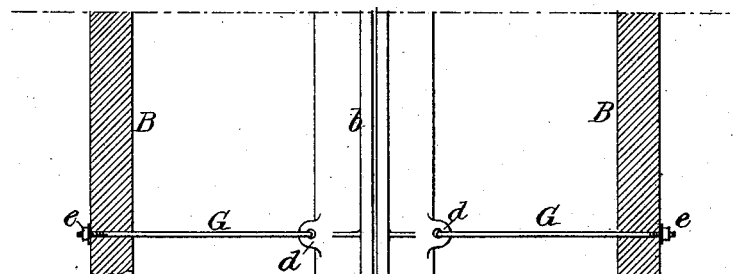
FIG. 2.
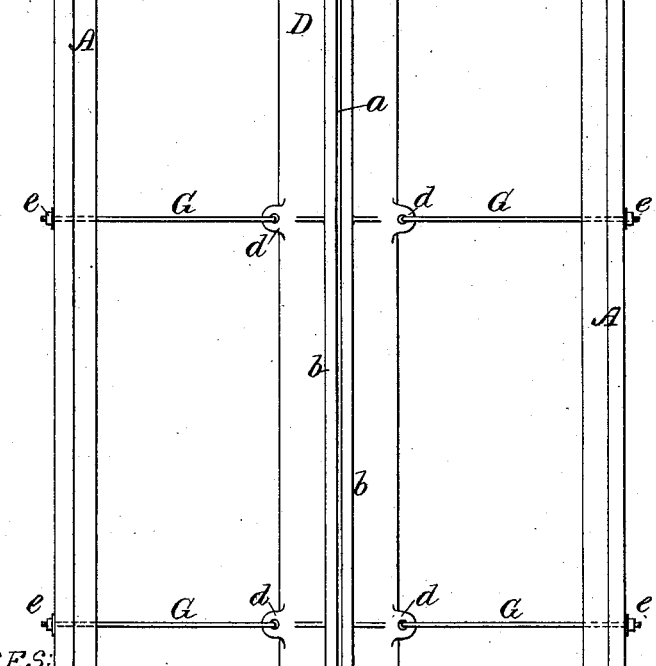
WITNESSES:
David Williams
James F. Tobin
INVENTOR:
William Wharton Jr
by his Attorneys
Howson & Son

UNITED STATES PATENT OFFICE.

WILLIAM WHARTON, JR., OF PHILADELPHIA, PENNSYLVANIA.

TRACTION-ROPE RAILWAY.

SPECIFICATION forming part of Letters Patent No. 281,593, dated July 17, 1883.

Application filed May 10, 1883. (No model.)

*To all whom it may concern:*

Be it known that I, WILLIAM WHARTON, Jr., a citizen of the United States, and a resident of Philadelphia, Pennsylvania, have invented certain Improvements in Traction-Rope Railways, of which the following is a specification.

My invention relates to an improvement in traction-rope railways—that is, a railway combined with a conduit containing the traction-rope, pulleys, &c., and having at the top a continuous slot.

My invention consists in combining the horizontal rail-supporting stringers with a conduit by means of transverse connecting-rods, so that in laying the conduit it can be easily and permanently adjusted in its proper position, and the parallelism of the slot of the conduit with the rails quickly attained and positively preserved, while the conduit itself will remain undisturbed by the vertical strains and shocks to which the stringers and rails are subjected.

In the accompanying drawings, Figure 1 is a transverse section of my improved traction-rope railway; and Fig. 2, a plan view, partly in section, and without the road-bed.

The two rails A A are secured to continuous stringers or sleepers B B, as in ordinary street-railways.

The pipe or conduit D for the traction-rope and pulleys is made in sections and preferably of cast-iron, the conduit having a continuous slot, $a$, bounded by flanges or ribs $b$ $b$. It has not been deemed necessary to show the traction-rope or pulleys, or the provision for gaining access to or draining the conduit, as these features form no part of my present invention. The conduit is embedded in the ground below the surface of the road-bed, to which, however, the ribs $b$, one on each side of the continuous slot, extend.

It is important that the slot $a$ of the conduit should be adjusted to and retained in a proper central position between the rails of the track, for which reason I pass rods or bolts G through the longitudinal stringers B at suitable intervals, one set of bolts through one set of stringers and another set through the opposite stringers, one set of bolts being attached to lugs $d$ on one side of the conduit and the other set to similar lugs on the opposite side of the same.

The simplest plan of making the attachment to the conduits is to bend a part of each bolt near the end of the same, and hook it through a hole in the lug, as shown in Fig. 1.

In laying the conduit, which is made in sections of suitable length, the nuts of the rods are used as a means of adjusting the said sections laterally to a central position, and after finally tightening the rods there can be no lateral displacement of the conduit, nor can it be turned; hence the continuous slot $a$ must always remain in its proper position in respect to the rails A A of the track.

The conduits and stringers being embedded in the ground independently of each other, the conduit cannot be disturbed by the vertical shocks and strains to which the stringers and rails are subjected by the cars and passing vehicles, for these shocks cannot be transmitted through the medium of the tie-bolts. In other words, while these bolts serve to maintain the conduits in proper lateral position, and to retain the parallelism of the slot with the rails, they permit the vertical yielding of the stringers independently of the conduit.

Keys may be substituted for nuts as a means of tightening the bolts, and the latter may be connected to the conduits in different ways. An eye, for instance, may be formed on each bolt and a pin passed through the lug on the conduit and the eye; but the plan shown is the most economical.

Conduits have heretofore been connected to the stringers of railways by rigid connections, which could not be used as mediums for the lateral adjustment of the said conduit in laying the same, whereas it is essential to my invention for effecting this adjustment that the rods or bolts should be capable of sliding in the stringers.

I claim as my invention—

1. The combination of the rail-supporting stringers or sills B B and the conduit D of a street-railway with bolts G, connected to the conduit, and passing through and made adjustable in the stringers, substantially as set forth.

2. The combination of the stringers B B and conduit D, with bolts G, each of which passes at one end through a stringer, and is bent at the opposite end for attachment to a lug on the conduit, all substantially as set forth.

In testimony whereof I have signed my name to this specification in the presence of two subscribing witnesses.

WILLIAM WHARTON, JR.

Witnesses:
HARRY L. ASHENFELTER,
HARRY SMITH.